United States Patent
Lettau et al.

(10) Patent No.: US 10,269,388 B2
(45) Date of Patent: Apr. 23, 2019

(54) CLIP-SPECIFIC ASSET CONFIGURATION

(75) Inventors: Ty Lettau, Hercules, CA (US); Ryan Tandy, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 688 days.

(21) Appl. No.: 11/842,490

(22) Filed: Aug. 21, 2007

(65) Prior Publication Data

US 2014/0304602 A1    Oct. 9, 2014

(51) Int. Cl.
| | | |
|---|---|---|
| *G11B 27/34* | (2006.01) | |
| *G11B 27/034* | (2006.01) | |
| *G11B 27/28* | (2006.01) | |
| *G11B 27/031* | (2006.01) | |
| *G06F 3/0481* | (2013.01) | |
| *G06F 3/0482* | (2013.01) | |
| *G06F 3/0483* | (2013.01) | |

(52) U.S. Cl.
CPC .................. *G11B 27/031* (2013.01)

(58) Field of Classification Search
CPC .... G06F 3/0482; G06F 3/0481; G06F 3/0483; G06F 3/04817; H04N 5/44543; G11B 27/34; G11B 27/034; G11B 27/105; G11B 27/02; G11B 27/031
USPC .................. 715/723, 724, 725, 716
See application file for complete search history.

(56) References Cited

U.S. PATENT DOCUMENTS

| | | | | |
|---|---|---|---|---|
| 5,781,188 A * | 7/1998 | Amiot et al. | ................. | 715/723 |
| 6,163,510 A * | 12/2000 | Lee | ................... | G06F 17/30787 360/13 |
| 6,204,840 B1 * | 3/2001 | Petelycky et al. | ............ | 715/202 |
| 6,400,378 B1 * | 6/2002 | Snook | ................... | G11B 27/034 707/999.102 |
| 6,873,327 B1 * | 3/2005 | Edwards | ................. | G06T 11/60 345/473 |
| 6,897,880 B2 * | 5/2005 | Samra | .......................... | 345/619 |
| 6,928,613 B1 * | 8/2005 | Ishii et al. | ..................... | 715/726 |
| 6,956,574 B1 | 10/2005 | Cailloux et al. | | |
| 6,973,647 B2 * | 12/2005 | Crudele | .................... | G06F 8/61 717/177 |
| 7,020,381 B1 * | 3/2006 | Kato et al. | ...................... | 386/52 |

(Continued)

OTHER PUBLICATIONS

Final Office Action in Related U.S. Appl. No. 11/706,040, dated Jan. 28, 2013, 23 pages.

(Continued)

*Primary Examiner* — Ryan F Pitaro
*Assistant Examiner* — Erik V Stitt
(74) *Attorney, Agent, or Firm* — Kilpatrick Townsend & Stockton LLP (57) ABSTRACT

Methods and apparatus provide for an asset binder configured to select a media asset to be associated with a media segment that is represented in media seamline of a user interface at a client system, thereby creating a relationship between the media segment and the media asset. At the client system, in real-time, the media asset is layered upon the media segment in order to present the media asset in conjunction with playback of the media segment in the user interface. The relationship between the media segment and the media asset can be described as a parent-child relationship, such that media segment content and media asset content are not intermingled. The asset binder does not combine content of the media segment with content of the media asset within a rendered and compiled media file.

15 Claims, 9 Drawing Sheets

(56) References Cited

U.S. PATENT DOCUMENTS

| | | | |
|---|---|---|---|
| 7,055,100 B2* | 5/2006 | Moriwake et al. | 715/723 |
| 7,069,310 B1 | 6/2006 | Bartholomew | |
| 7,123,696 B2 | 10/2006 | Lowe | |
| 7,280,738 B2 | 10/2007 | Kauffmann et al. | |
| 7,432,940 B2* | 10/2008 | Brook et al. | 345/629 |
| 7,434,155 B2* | 10/2008 | Lee | 715/203 |
| 7,493,014 B2* | 2/2009 | McGrath | G11B 27/031 386/248 |
| 7,546,532 B1* | 6/2009 | Nichols et al. | 715/716 |
| 7,587,674 B2* | 9/2009 | Broeksteeg | 715/723 |
| 7,636,889 B2* | 12/2009 | Weber et al. | 715/723 |
| 7,644,364 B2* | 1/2010 | Patten et al. | 715/726 |
| 7,725,828 B1* | 5/2010 | Johnson | 715/726 |
| 2002/0146236 A1* | 10/2002 | Kauffman et al. | 386/55 |
| 2002/0169797 A1 | 11/2002 | Hegde et al. | |
| 2003/0084447 A1* | 5/2003 | Lee | 725/44 |
| 2003/0106061 A1* | 6/2003 | Gusler et al. | 725/59 |
| 2003/0219234 A1 | 11/2003 | Burda | |
| 2004/0001079 A1* | 1/2004 | Zhao et al. | 345/719 |
| 2004/0027367 A1 | 2/2004 | Pilu | |
| 2004/0150663 A1* | 8/2004 | Kim | G11B 27/034 715/723 |
| 2005/0020359 A1 | 1/2005 | Ackley et al. | |
| 2005/0034083 A1 | 2/2005 | Jaeger | |
| 2005/0053356 A1 | 3/2005 | Mate et al. | |
| 2005/0165726 A1* | 7/2005 | Kawell et al. | 707/1 |
| 2006/0053115 A1* | 3/2006 | Ashby | 707/10 |
| 2006/0156219 A1 | 7/2006 | Haot et al. | |
| 2006/0195786 A1* | 8/2006 | Stoen et al. | 715/700 |
| 2007/0059676 A1* | 3/2007 | Jeong | G09B 5/06 434/365 |
| 2007/0074115 A1* | 3/2007 | Patten | G11B 27/032 715/716 |
| 2007/0209005 A1* | 9/2007 | Shaver et al. | 715/733 |
| 2007/0233840 A1 | 10/2007 | Alstrup et al. | |
| 2007/0285736 A1* | 12/2007 | Han Ching | H04N 5/2621 358/474 |
| 2008/0016114 A1 | 1/2008 | Beauregard et al. | |
| 2008/0046925 A1 | 2/2008 | Lee et al. | |
| 2008/0068458 A1 | 3/2008 | Carroll | |
| 2008/0112683 A1* | 5/2008 | Lin | G11B 27/034 386/278 |
| 2008/0281788 A1* | 11/2008 | Frieder | G06F 17/301 |
| 2009/0310932 A1 | 12/2009 | Hsieh et al. | |
| 2010/0095289 A1* | 4/2010 | Nguyen | G06F 8/68 717/169 |
| 2011/0102679 A1* | 5/2011 | Relan et al. | 348/584 |

OTHER PUBLICATIONS

United States Patent and Trademark Office, Office Action, U.S. Appl. No. 11/705,983 dated Jun. 23, 2011, 15 pages.
United States Patent and Trademark Office, Office Action, U.S. Appl. No. 11/706,040, dated Jan. 6, 2012, 18 pages.
United States Patent and Trademark Office, Office Action, U.S. Appl. No. 11/706,040, dated Sep. 20, 2011, 20 pages.
United States Patent and Trademark Office, Office Action, U.S. Appl. No. 12/349,402, dated Oct. 4, 2011, 34 pages.
U.S. Appl. No. 11/706,040 , "Office Action", dated Jun. 27, 2012, 23.
U.S. Appl. No. 12/349,402 , "Office Action", dated Apr. 5, 2012, 41.
Non Final Office Action in Related U.S. Appl. No. 11/706,040, dated Jun. 10, 2013, 26 pages.

* cited by examiner

CLIP-SPECIFIC ASSET CONFIGURATION

BACKGROUND

Conventional video editing software applications enable users to edit, manage and create various types of video media content for personal and/or professional purposes. Based on use of such applications, digital videos, images and sounds may be modified and combined in conventional video editing software to produce a desired multi-media effect.

Typically, a user can access various types of digital content on a local computer using a corresponding graphical user interface (e.g., including menus, icons, toolbar functions, etc.) associated with an executed video editing software application. In such a context, as mentioned above, the video editing software typically enables users to add graphics (e.g., superimpose captions, titles, etc.) and effects to the edited video media content. Such effects may include features such as a black and white mode, blurring of images and video frames, transition schemes for transitioning between video clips, and/or similar methods suitable for producing creative digital video content.

SUMMARY

Conventional systems, such as those explained above, suffer from a variety of deficiencies. In particular, conventional systems are delivered on desktop video editing applications that employ destructive video editing processes. In such conventional systems, when a user applies a video asset (e.g. graphics, transitions) to a particular video frame(s), the "original" video frame upon which the video edit applied is not retained. Rather, conventional systems require the compiling and rendering of an entirely new media file with content composed of the edited video frame, which includes content from the applied video asset. Thus, compiling and rendering the new media file consumes valuable resources.

Since conventional systems employ destructive editing, the user experience lacks flexibility during the editing workflow. For example, it is not possible for the user to create different edited versions of a video frame, where each version has different video assets, since the "original" video frame is lost once the first edited version is created. If the user is unsure as to the desirability of a particular editing sequence, conventional systems do not allow for an efficient approach for previewing the edited video frame based on the questionable editing sequence. Here, the user would be required to perform the questionable editing sequence and then create an entirely new media file. Thus, if the user ultimately decides that the questionable editing sequence was not acceptable, the "original" video frame is permanently destroyed and the valuable time and processing resources were wasted.

Further, conventional systems are often menu dependent which requires the user to interact with pull down menus to execute editing actions. In addition, conventional systems use the presentation of timelines to guide a user's interactions with regard to editing video frames. To mix and edit video frames, users must master the timeline functionality in order to coordinate desired edits and enhancements at particular moments in time of the video. Thus, conventional video editing is too complex, especially for the novice or casual user.

Some conventional systems (such as www.eyespot.com) allow for editing video clips online by assigning edits to the video clips. However, the assigned edits are not previewable since a complete re-rendering of the edited video clip is required. Thus, such conventional systems require server-side rendering of the edited video clip (which includes the assigned edit) prior to providing a preview of the edited video clip as a whole.

Embodiments of the invention significantly overcome such deficiencies and provide mechanisms and techniques that provide an asset binder to layer media assets upon media segments in real-time. Via a drag-and-drop functionality, the user can select the media asset and drag an instance of media asset to the media segment to automatically associate the instance of the media asset with the media segment without relying on menu selections.

Instructions within an edit decision list that corresponds with the media segment are created to represent the relationship between the media segment and the media asset. When the edit decision list is executed at a server system, the media asset and the media segment are transmitted to a client system. However, the asset binder avoids the need to compile and render a media file which includes content from both the media segment and the media asset. As the client system receives the media segment and the media asset, the asset binder layers the media asset over the media segment such that the media segment can be visualized with the media asset. Thus, the asset binder presents the media segment with the media asset to the user independent of server-side rendering functionality.

Specifically, the asset binder selects a media asset to be associated with a media segment (e.g. a video clip) that is represented in media seamline of a user interface at a client system, thereby creating a relationship between the media segment and the media asset. At a client system, in real-time, the media asset is layered upon the media segment in order to present the media asset in conjunction with playback of the media segment in the user interface.

The relationship between the media segment and the media asset can be described as a parent-child relationship, such that the media asset is bound to the media segment. Further, the parent-child relationship assures that media segment content and media asset content are not intermingled, that the media asset can receive and process operations executed on the media segment, and that the media asset can receive and process operations executed on the media asset independent of the media segment. In addition, the media asset adapts to the media segment such that the media asset automatically conforms to a duration of the media segment.

Other embodiments include a computerized device, configured to process all the method operations disclosed herein as embodiments of the invention. In such embodiments, the computerized device includes a memory system, a processor, communications interface in an interconnection mechanism connecting these components. Thus, any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing an extensible master-slave user interface with distinct interaction models as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Adobe Systems, Incorporated of San Jose, Calif.

BRIEF DESCRIPTION OF THE DRAWINGS

The foregoing and other objects, features and advantages of the invention will be apparent from the following more particular description of embodiments of the methods and apparatus for an asset binder to layer media assets upon media segments in real-time in conjunction with playback of the media segments, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Methods and apparatus provide for an asset binder to layer media assets upon media segments in real-time. A media asset (e.g. title, overlay, framing, graphic, etc.) can be dragged upon a thumbnail of media segment, such as a video clip. The asset binder allows a user to visualize the media segment with the media asset of server-side rendering functionality. Specifically, the asset binder selects a media asset to be associated with a media segment that is represented in media seamline of a user interface at a client system, thereby creating a relationship between the media segment and the media asset. At the client system, in real-time, the media asset is layered upon the media segment in order to present the media asset in conjunction with playback of the media segment in the user interface.

The relationship between the media segment and the media asset can be described as a parent-child relationship, such that the media asset is bound to the media segment. Further, the parent-child relationship assures that media segment content and media asset content are not intermingled, that the media asset can receive and process operations executed on the media segment, and the media asset can receive and process operations executed on the media asset independent of the media segment. In addition, the media asset adapts to the media segment such that the media asset automatically conforms to a duration of the media segment.

The asset binder removes the need for a timeline from the conventional video editing workflow. Instead, the asset binder provides a media seamline that presents a sequence of video clips, stacked end-to-end, that can be used as a media base into which any media asset can be "snapped" (e.g. drag-and-dropped). The video clips can play sequentially, where each clip initiates playback when the preceding clip has completely played its content. By not having a direct reference to time, a user is not forced to think about aligning, syncing and splicing the video clips to conform to a particular span of time. Rather, in one embodiment of the asset binder, when a media asset is applied to a particular video clip, that media asset is automatically incorporated with the video clip for the duration the video clip regardless of when the video clip occurs in the total video clip sequence. It is understood that the media asset can also be a transition placed in between two media segments (i.e. two video clips).

Figure 1:
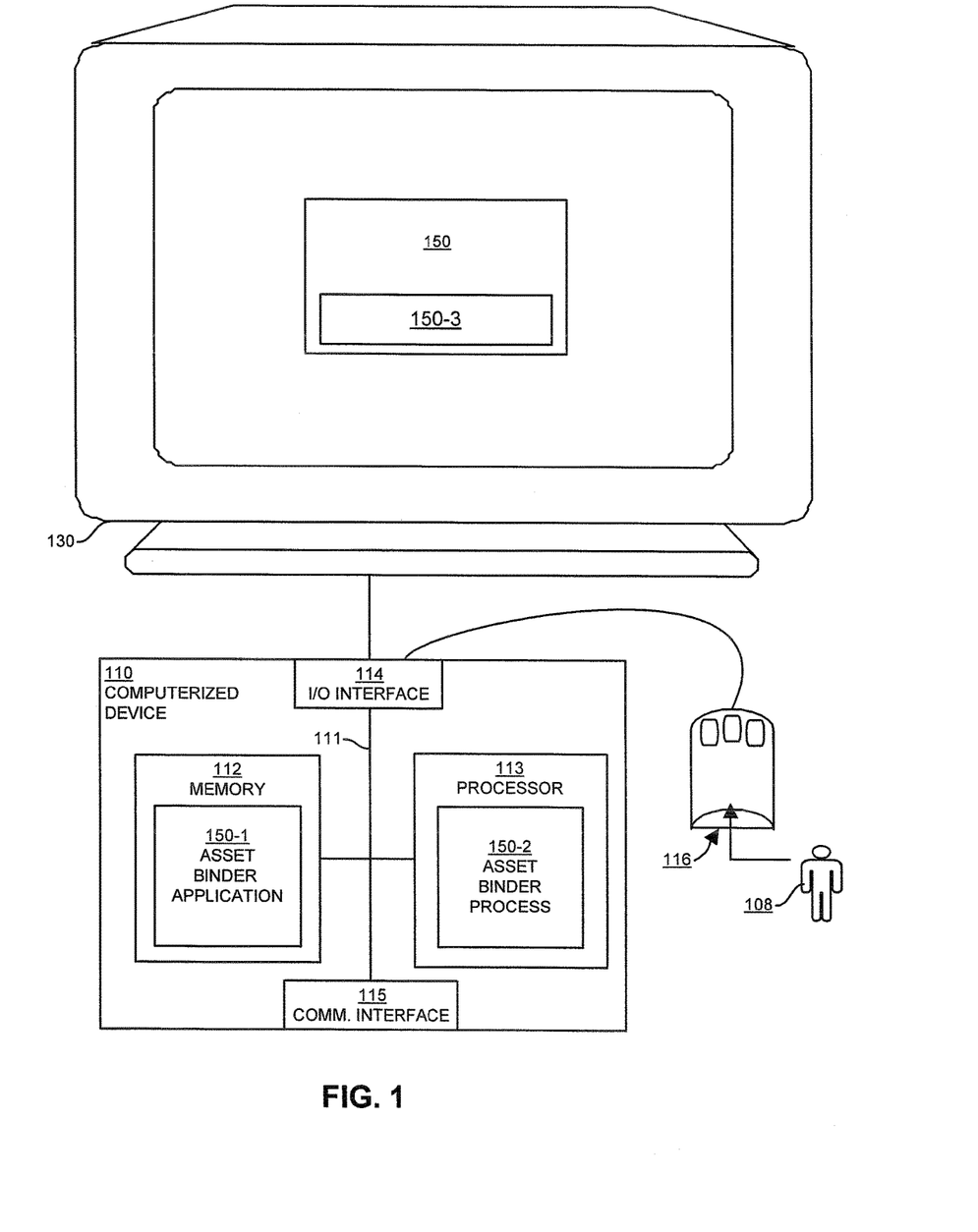
FIG. 1 is a block diagram of a computer system configured with an asset binder according to embodiments herein.

Turning now to FIG. 1, a block diagram illustrates an example of architecture for a computer system 110 that executes, runs, interprets, operates or otherwise performs an asset binder application 150-1 and/or asset binder process 150-2 (e.g. an executing version of the application 150-1 controlled by user 108) according to embodiments herein. The computer system 110 may be any type of computerized device such as a personal computer, a client computer system, workstation, portable computing device, console, laptop, network terminal or the like.

As shown in the present example, the computer system 110 includes an interconnection mechanism 111 such as a data bus, motherboard or other circuitry that couples a memory system 112, a processor 113, an input/output interface 114, and a display 130 presenting a graphical user interface for an asset binder 150 with a media seamline 150-3. An input device 116 (e.g., one or more user/developer controlled devices such as a keyboard, mouse, touch pad, etc.) couples to the computer system 110 and processor 113 through an input/output (I/O) interface 114.

The memory system 112 can be any type of computer readable medium and, in this example, is encoded with a asset binder application 150-1 that supports generation, display, and implementation of functional operations as will be further explained herein. During operation of the computer system 110, the processor 113 accesses the memory system 112 via the interconnect 111 in order to launch, run, execute, interpret or otherwise perform the logic instructions of the asset binder application 150-1. Execution of the asset binder application 150-1 in this manner produces the asset binder process 150-2. In other words, the asset binder process 150-2 represents one or more portions or runtime instances of the asset binder application 150-1 (or the entire application 150-1) performing or executing within or upon the processor 113 in the computerized device 110 at runtime.

Those skilled in the art will understand that the computer system 110 may include other processes and/or software and hardware components, such as an operating system not shown in this example. A display 130 need not be coupled directly to computer system 110. For example, the asset binder application 150-1 can be executed on a remotely accessible computerized device via the network interface 115. In this instance, the graphical user interface 104 may be displayed locally to a user 108 of the remote computer, and execution of the processing herein may be client-server based.

During operation of the computer system 110, the processor 113 accesses the memory system 112 via the interconnect 111 in launch, run, execute, interpret or otherwise perform the logic instructions of the asset binder application 150-1. Execution of the asset binder application 150-1 in this manner produces processing functionality in an asset binder process 150-2. In other words, the asset binder process 150-2 represents one or more portions or runtime instances of the asset binder application 150-1 (or the entire asset binder application 150-1) performing or executing within or upon the processor 113 in the computerized device 110 at runtime.

Figure 2:
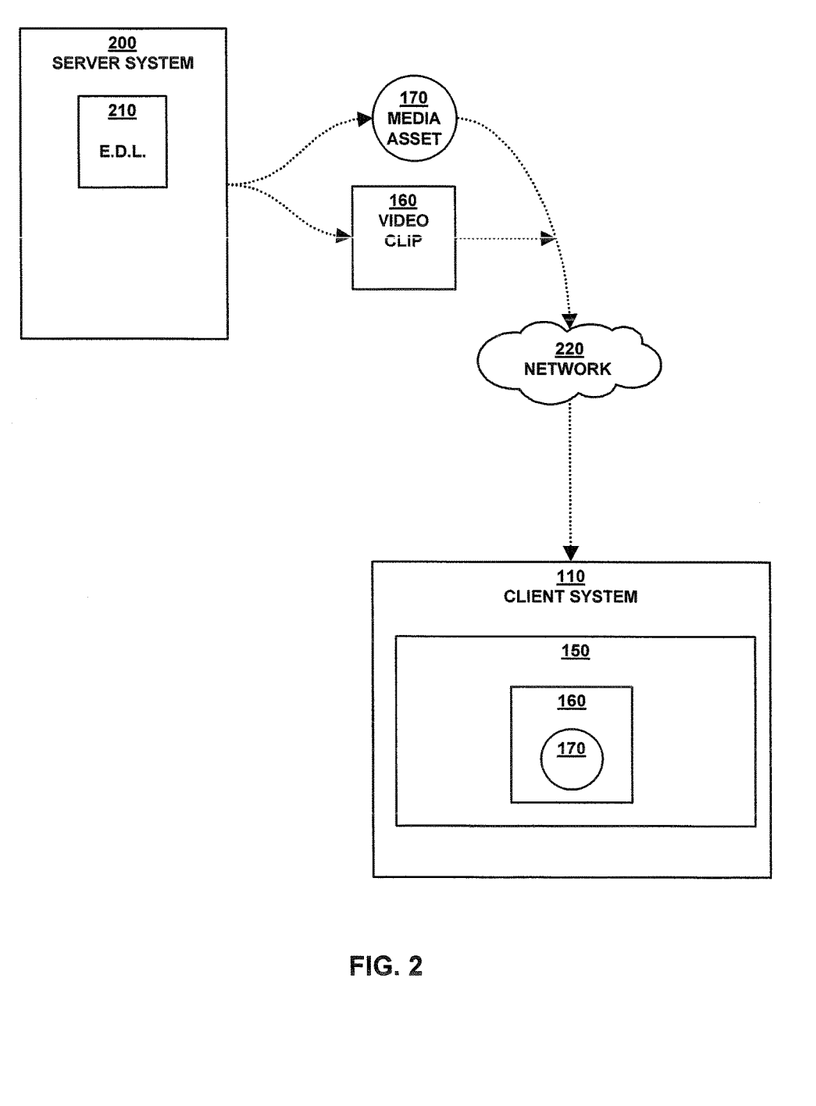
FIG. 2 is a block diagram of a server-client system configured with an asset binder in an online environment according to embodiments herein.

FIG. 2 is a block diagram of a server-client system configured with an asset binder in an online environment according to embodiments herein. The asset binder 150 creates instructions for an edit decision list 210 at the server system 200. It is understood that the edit decision list 210 can be an XML-based text file that contains instructions and information for the server associated with the asset binder 150 as to edits, sequencing, and editing operations performed by the user. The server system 200 executes the edit decision list 210 to transmit a video clip 160 and an associated media asset 170, per the edit decision list 210 instructions, without compiling a media file that includes both media segment content and the media asset content At the client system 110, the asset binder 150 receives the video clip 160 and the media asset 170 for playback in a user interface in accordance with the relationship between the media segment and the media asset independent of server-side rendering functionality. Thus, the asset binder 150 layers the media asset 170 upon the video clip 160 in real-time in order to allow the user to visualize the media segment 160 with the media asset 170.

Figure 3:
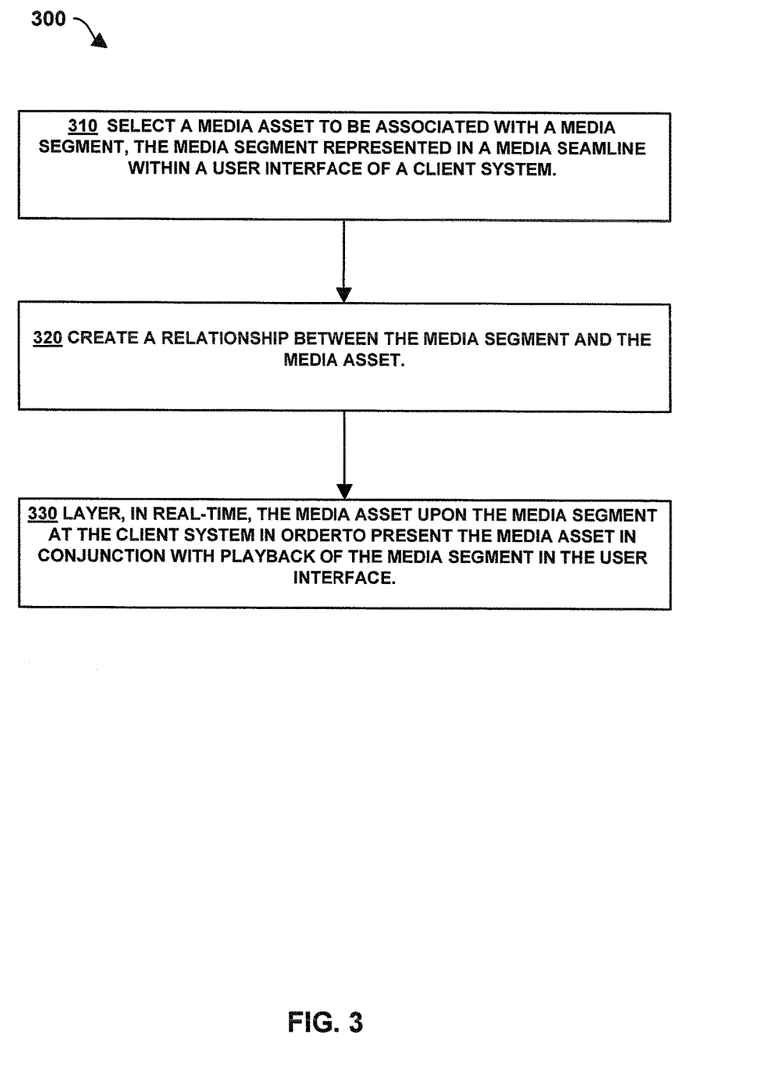
FIG. 3 is a flowchart of processing steps performed by an asset binder to layer a media asset onto a media segment according to embodiments herein.

FIG. 3 is a flowchart of processing steps performed by an asset binder 150 to layer a media asset onto a media segment according to embodiments herein. At step 310, the asset binder 150 selects a media asset 170 to be associated with a media segment 160. For example, the asset binder 150 can provide a user with a media bin containing a variety of media assets. The user can select a "thought bubble" to be added to a video clip (i.e. media segment 160) that is represented in the user interface of the asset binder 150.

The user interface of the asset binder 150 can provide the media seamline 150-3 for capturing and organizing the media segments in relation to each other according to a sequence. A representation of each of the captured media segments 160 is then displayed in accordance with the sequence. Additionally, the user interface of the asset binder 150 provides an editing-video screen associated with the media seamline 150-3 to allow for: playback of at least one of the media segments 160 in the media seamline 150-3 and the performance of editing operations on a media segment 160 from the media seamline 150-3. Such editing operations performed in the editing video screen include, for example, associating the instance of the media asset 170 with the media segment 160 via a drag-and-drop functionality, customizing the media asset 170, and a split operation. It is understood that the editing-video screen can allow for the performance of a variety of other editing operations that enhance, modify, and manipulate both the media segment 160 and the media asset 170.

At step 320, the asset binder 150 creates a relationship between the media segment 160 and the media asset 170. Hence, the media asset 170 is tied to (i.e. bound to) the media segment 160 for the segment's duration and the media asset 170 acquires a relationship with the media segment 160 such that it travels with the media segment 160 and can automatically process operations and modifications that are applied to the media segment 160.

At step 330, the asset binder 150 layers, in real-time, the media asset upon the media segment at the client system in order to present the media asset in conjunction with playback of the media segment in the user interface.

Figure 4:
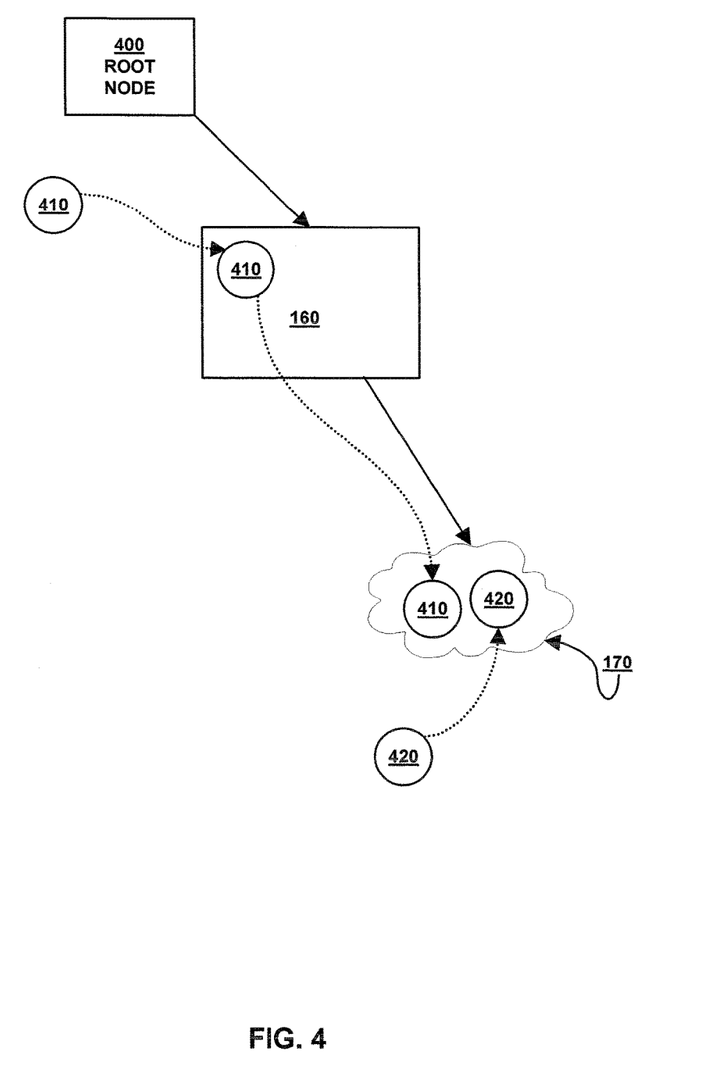
FIG. 4 is a block diagram of a relationship between a video clip and a media asset of an asset binder according to embodiments herein.

FIG. 4 is a block diagram of a relationship between a video clip and a media asset of an asset binder 150 according to embodiments herein. FIG. 4 includes a video clip 160 (i.e. media segment) and a media asset 170 (e.g. a thought bubble) which has been associated with the video clip 160. In addition, a video clip operation 410 is presented as being applied upon the video clip 160. An asset operation 420 is presented as being applied upon the media asset 170. It is understood that the operations 410, 420 are presented abstractly as circles that are visible within both the video clip 160 and the media asset 170. It should be noted that such an abstract presentation is intended to convey that the operations 410, 420 are processed by the video clip 160 and the media asset 420 and not that the operations 410, 420 are necessarily intended to be visualized during playback of the video clip 160.

Figure 5:
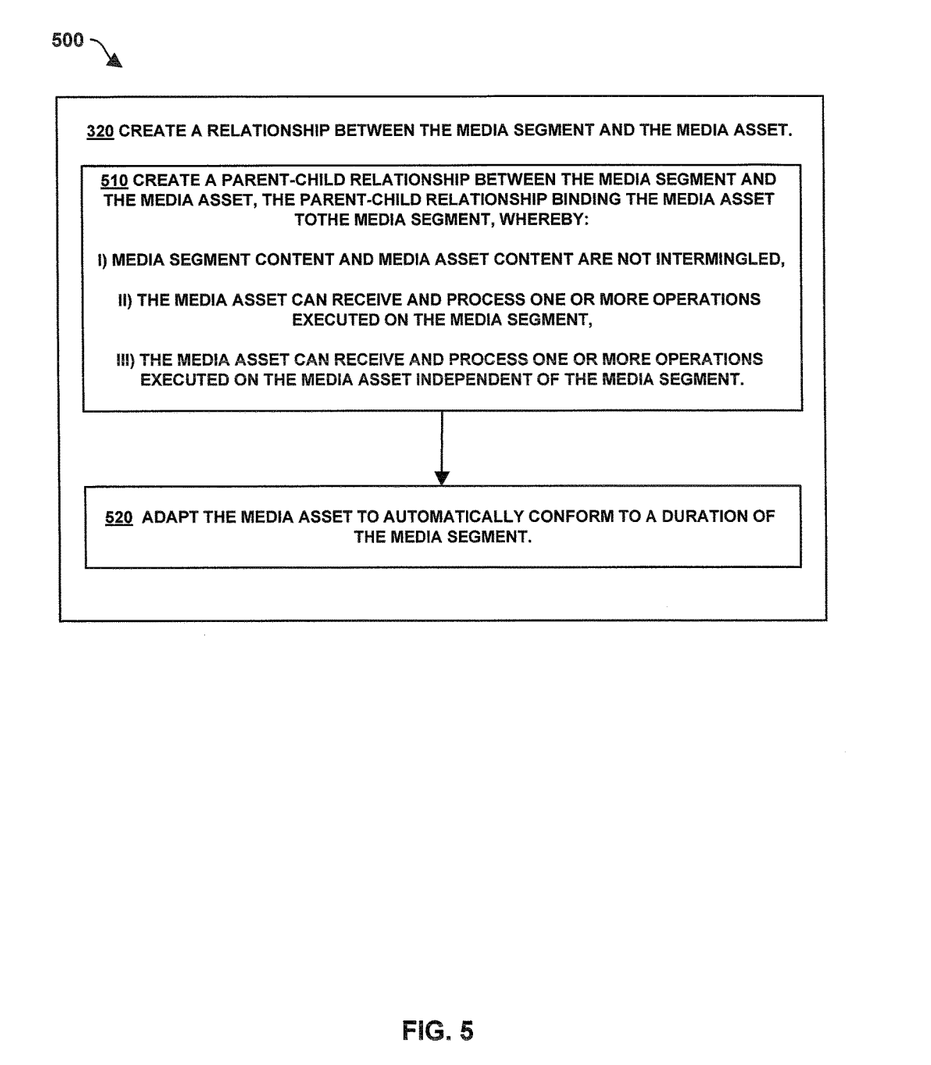
FIG. 5 is a flowchart of processing steps performed by an asset binder to create a parent-child relationship between a media asset and a media segment according to embodiments herein.

FIG. 5 is a flowchart of processing steps performed by an asset binder 150 to create a parent-child relationship between a media asset and a media segment according to embodiments herein. At step 510, the asset binder 150 creates a parent-child relationship between the media segment 160 and the media asset 170, the parent-child relationship binds the media asset 170 to the media segment 160. In one embodiment of the asset binder 150, the parent-child relationship can include a root node 400 (i.e. a default media segment) that contains no content. The child from the root node can be a selected video clip 160. Once a media asset 170 is selected and associated with the video clip 160, the media asset 170 is a child of the video clip 160. In another embodiment, the media asset 170 (such as a title graphic) can be directly associated with the root node 400 (i.e. default media segment), such that only the media asset 170 itself is presented during playback.

Further, the parent-child relationship provides that i) media segment content and media asset content are not intermingled, ii) the media asset can receive and process one or more operations executed on the media segment, and iii) the media asset can receive and process one or more operations executed on the media asset independent of the media segment.

In one embodiment of the asset binder 150, a video effect (such as black-and-white) can be applied to a video clip 160 that has an associated media asset 170. Since the video clip 160 and the media asset 170 are in a parent-child relationship, the video effect can be applied to the media asset 170 even though there is no intermingling of content from the video clip 160 and the media asset 170. However, the media asset 170 can receive operations and processes independent of the video clip 160.

At step 520, the asset binder 150 adapts the media asset to automatically conform to a duration of the media segment. For example, the user need not interact with a menu of editing commands to set the time in which the media asset appears during playback of the media segment 160. If the media asset 170 is a "thought bubble," then the "thought bubble" will appear throughout the entire duration of the media segment 160 when the media segment 160 is played back. However, it is understood that the asset binder 150 allows for the media asset 170 (i.e. the "thought bubble") to be configured (i.e. customized) while the media asset 170 is associated with the media segment 160. Thus, for example, the user interface of the asset binder 150 allows the user to configure the media asset 170 to appear in the media segment 160 for only a portion of the media segment's 160 entire duration.

Figure 6:
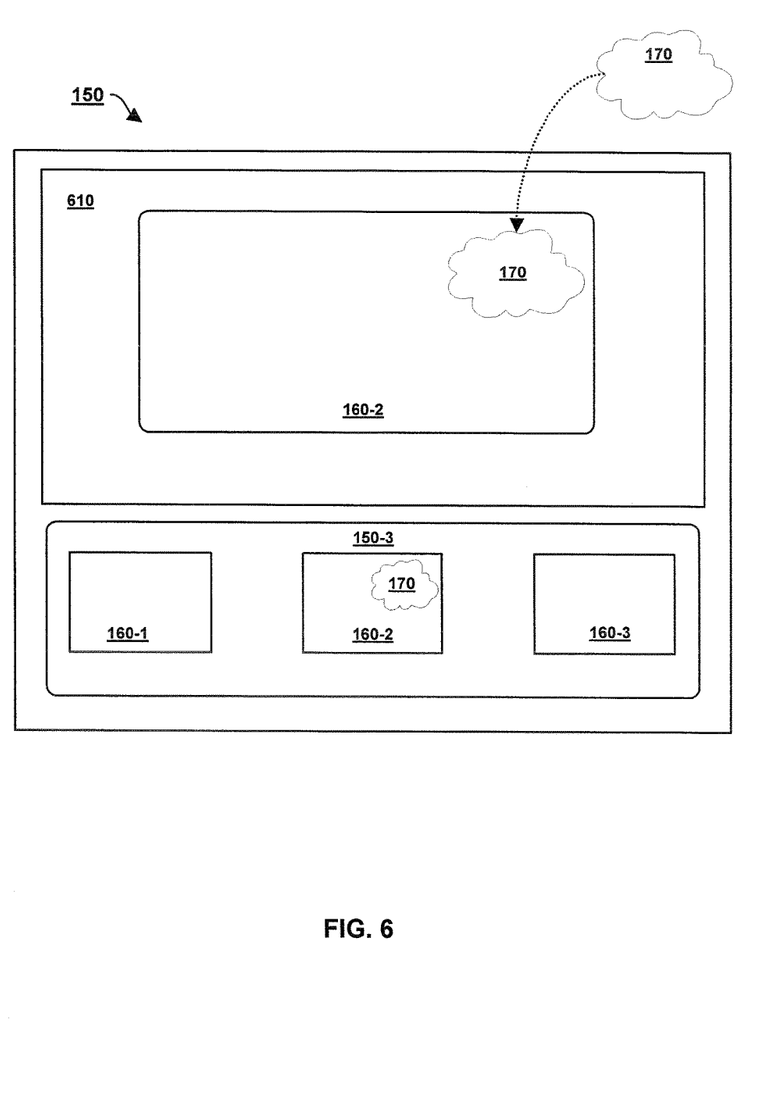
FIG. 6 is a block diagram of an asset binder allowing for an instance of a media asset to be dragged to a media segment according to embodiments herein.

FIG. 6 is a block diagram of an asset binder 150 allowing for an instance of a media asset to be dragged to a media segment according to embodiments herein. FIG. 6 includes a media seamline 150-3 associated with an editing-video screen 610. The media seamline 150-3 includes three representations of video clips (i.e. media segments) 160-1, 160-2, and 160-3 that are organized within the media seamline 150-3. Video clip 160-2 is a video clip layered with a media asset 170 (e.g. a graphic "thought bubble") and is presented in both the media seamline 150-3 and the editing-video screen 310.

Figure 7:
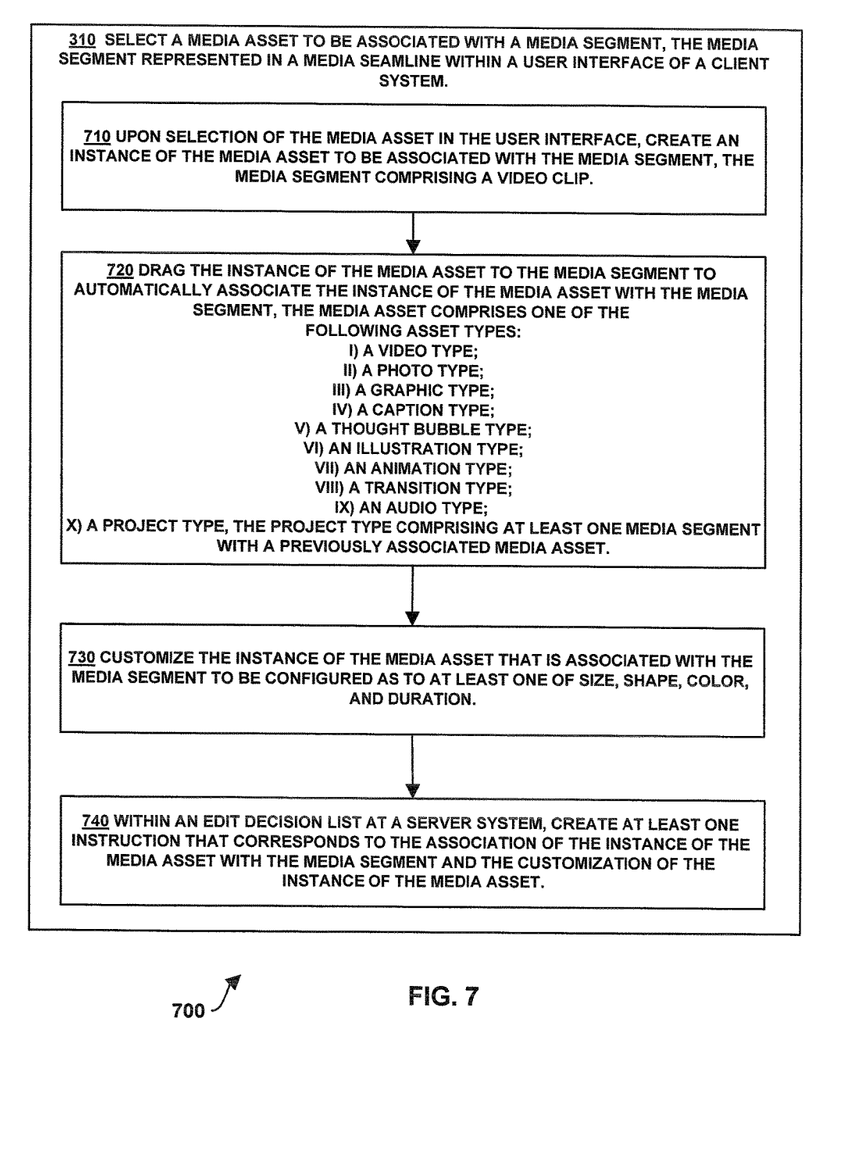
FIG. 7 is a flowchart of processing steps performed by an asset binder to drag an instance of a media asset to a media segment according to embodiments herein.

FIG. 7 is a flowchart of processing steps performed by an asset binder 150 to drag an instance of a media asset to a media segment according to embodiments herein. Upon selection of the media asset 170 in the user interface, at step 710, the asset binder 150 creates an instance of the media asset to be associated with the media segment, the media segment comprising a video clip. For example, in one embodiment, the user interface of the asset binder 150 can include a media bin with a collection of media assets. If the user selects a "thought bubble" asset 170 to be layered on a video clip 160-2, the asset binder creates an instance of the "thought bubble" asset 170. Thus, the "thought bubble" asset 170 is retained in the media bin and the instance of the "thought bubble" asset 170 becomes associated with the video clip 160-2.

At step 720, the asset binder 150 allows the user to drag the instance of the media asset 170 to the media segment 160 to automatically associate the instance of the media asset 170 with the media segment 160. At step 730 customizes the instance of the media asset 170 that is associated with the media segment 160 to be configured as to at least one of size, shape, color, and duration. At step 740, an edit decision list 210 at a server system 200, creates at least one instruction that corresponds to the association of the instance of the media asset 170 with the media segment 160 and the customization of the instance of the media asset 170.

For example, a thumbnail of the opening video frame of video clip 160-2 can be represented in the editing-video screen 610. The asset binder 150 can allow the user to drag the media asset 170 (the "thought bubble") onto the thumbnail. Once the media asset is dragged onto the thumbnail, the media instance becomes automatically associated with the entire video clip 160-2 and the server system 200 updates an edit decision list 210 to include one or more instructions describing the association of the video clip 160-2 and the media asset 170. The asset binder 150 allows the user to customize the instance of the media instance 170 after it has become associated with the video clip 160-2, and the edit decision list 210 records the customizations selected by the user. The user can reshape and resize the appearance of the instance of the media instance 170, for example. In addition, a representation of the video clip 160-2 with the media asset 170 will appear in the media seamline 150 where the prior "unedited" version of the video clip 160-2 previously appeared. If the user wants a preview of how the video clip 160-2 will look with the media asset 170, the user can select a "play" command of the user interface.

To play the video clip 160-2 with the media asset 170, the server system will execute the edit decision list, sending the video clip 160-2 and the customized media asset 170 to the portion of the asset binder 150 that is running on a client system 110. At the client system 110, the asset binder 150 can layer the media asset 170 over the video clip 160-2 in conjunction with playback of the video clip 160-2. Thus, the asset binder does not compile and render a media file that contains content for the video clip 160-2 and the media asset 170. Instead, the asset binder 150 layers, in real-time, the media asset 170 onto the video clip 160-2 as the video clip 160-2 is received from the server system 200. Thus, the user can view the video clip 160-2 with the media asset 170 without requiring any server-side rendering functionality.

It is understood that the media asset can be a variety of media asset types, such as: a video type, a photo type, a graphic type, a caption type, a thought bubble type, an illustration type, an animation type, a transition type, an audio type, and a project type. The project type can be media segment with a previously associated media asset. Thus, the asset binder 150 allows a user to select an video clip 160 (or a series of video clips 160) with associated media assets 170 to be associated with another video clip in a parent-child relationship.

Figure 8:
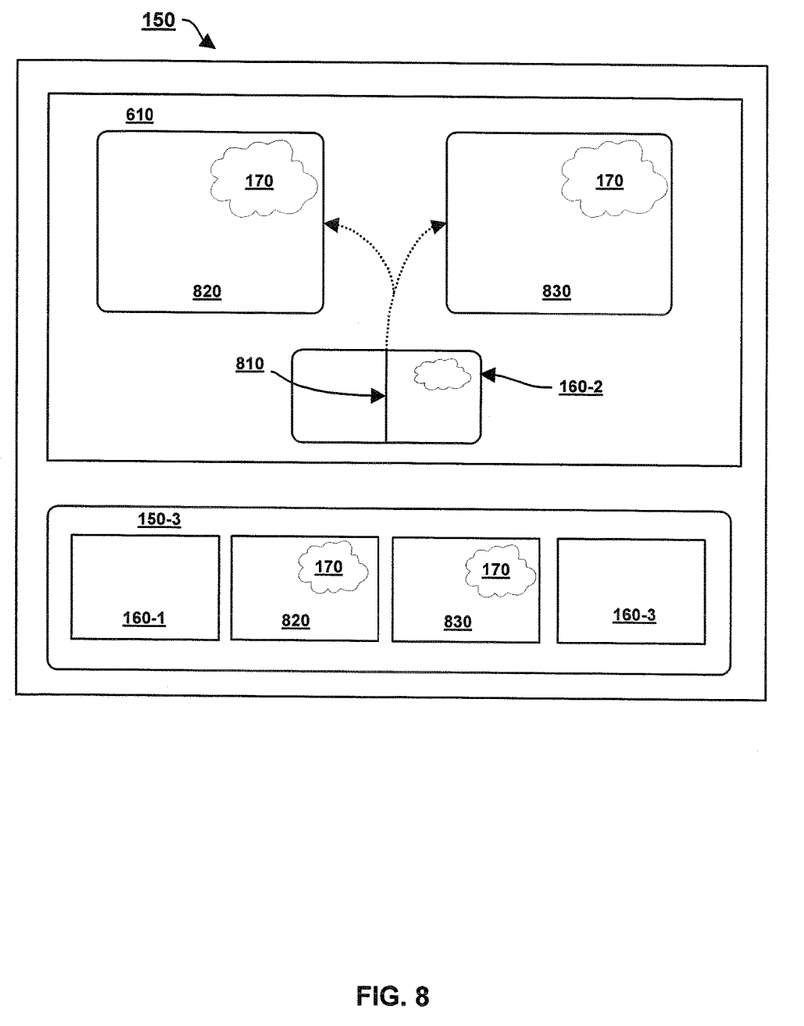
FIG. 8 is a block diagram of a split operation on a video clip of asset binder according to embodiments herein.

FIG. 8 is a block diagram of a split operation on a video clip of asset binder 150 according to embodiments herein. FIG. 8 includes a media seamline 150-3 associated with an editing-video screen 310. The media seamline 150-3 includes four representations of video clips (i.e. media segments) 160-1, 820, 830 and 160-3 that are organized within the media seamline 150-3. Video clip 160-2 is a video clip with a media asset 170 (e.g. a graphic "thought bubble") and is presented in the editing-video screen 310. The video clip 160-2 is undergoing a "split" operation at split point 810. Due to the split operation, two instances 820, 830 of the video clip 160-2 are created.

Figure 9:
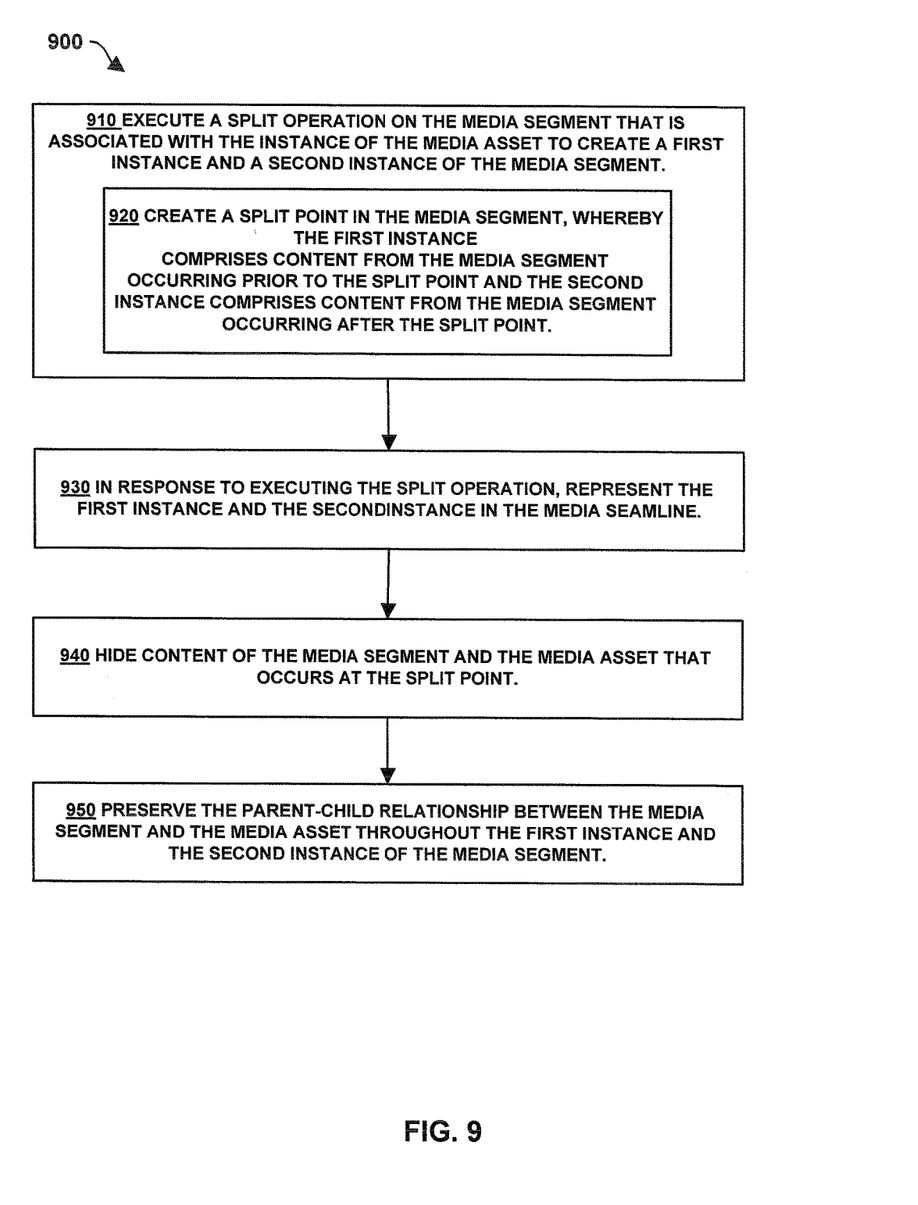
FIG. 9 is a flowchart of processing steps performed by an asset binder to create a split point in a video clip according to embodiments herein.

FIG. 9 is a flowchart of processing steps performed by an asset binder 150 to create a split point in a video clip according to embodiments herein. At step 910, the asset binder 150 executes a split operation on the media segment 160-2 that is associated with an instance of the media asset 170 to create a first instance 820 and a second instance 830 of media segment 160-2. At step 920, the asset binder 150 creates a split point 810 in the media segment 160-2 such that the first instance 820 comprises content from the media segment 160-2 that occurs prior to the split point 810 and the second instance 830 includes content from the media segment 160-2 that occurs after the split point 810.

At step 930, in response to executing the split operation, the asset binder 150 represents the first instance 820 and the second instance 830 in the media seamline 150-3.

At step 940, the asset binder 150 hides content of the media segment 160-2 and the media asset 170 that occurs at the split point 810 such that the hidden content is not presented to user upon playback of the first instance 820 and the second instance 830 of the media segment.

At step 950, the asset binder 150 preserves the parent-child relationship between the media segment 160-2 and the media asset 170 throughout the first instance 820 and the second instance 830 of the media segment 160-2. However, it is understood that the each instance 820, 830 has its own parent-child relationship with a distinct instance of the media asset 170. Thus, the instance of the media asset 170 that was associated with the original clip 160-2 is not shared among the first instance 820 and the second instance 830 of the media segment 160-2.

It is noted that example configurations disclosed herein include the asset binder application 150-1 itself (i.e., in the form of un-executed or non-performing logic instructions and/or data). The asset binder application 150-1 may be stored on a computer readable medium (such as a floppy disk), hard disk, electronic, magnetic, optical, or other computer readable medium.

Note again that techniques herein are well suited for an asset binder 150 configured to layer, in real-time, a media asset(s) 170 over one or more media segments 160-1, 160-2, 160-3 in conjunction with playback of the media segments. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
  receiving, at a client system, an input for applying a video effect to a video clip, wherein the video effect and the video clip are stored in a storage system accessible by a server system remote from the client system;
  based on the input, creating, at the client system, a parent-child relationship between the video clip and the video effect, wherein the parent-child relationship associates the video clip and the video effect so that video customization operations on the video clip by the client system are also processed on the video effect by the client system and that video customization operations on the video effect by the client system are processed on the video effect independent of the video clip;
  in response to receiving, at the client system, an additional input to play the video clip, receiving from the server system, the video clip and the video effect as separate media files, wherein the server system does not apply the video effect to the video clip; and
  playing, at the client system, the video clip by overlaying the video effect on the video clip for an entire duration of the video clip according to the parent-child relationship in real-time without compiling or rendering the video clip and the video effect into a single media file.

2. The method of claim 1, wherein the playing and overlaying occurs while receiving the video clip from the server system.

3. The method of claim 1, further comprising:
  in response to receiving, at the client system, a command to apply a video customization operation to the video effect, determining from the parent-child relationship that the video customization operation is to be applied to the video effect independent of the video clip; and
  receiving a customized video clip from the server system and playing, at the client system, the video clip by overlaying the customized video effect on the video clip in real-time without compiling or rendering the video clip and the customized video effect into a single media file.

4. The method of claim 1, further comprising:
  in response to receiving, at the client system, a command to apply a video customization operation to the video clip, determining from the parent-child relationship that the video customization operation is to be applied to the video clip and to the video effect; and
  receiving a customized video clip and a customized video effect from the server system and playing, at the client system, the customized video clip by overlaying the customized video effect on the customized video clip in real-time without compiling or rendering the customized video clip and the customized video effect into a single media file.

5. A method comprising:
  receiving, at a server system from a client system, a reference to a video clip, the server system in communication with a computer-readable medium;
  receiving, at the server system, a reference to a video effect;
  receiving, at the server system, an additional input specifying a parent-child relationship between the video clip and the video effect;
  creating, at the server system, an edit decision list describing the parent-child relationship of the video clip and the video effect, wherein the parent-child relationship associates the video clip with the video effect, so that video customization operations on the video clip by the client system are also processed on the video effect by the client system and that video customization operations on the video effect by the client system are processed on the video effect independent of the video clip;
  storing, at the server system, the edit decision list;
  in response to receiving, at the server system, a request to play the video clip from the client system:
    executing, at the server system, the edit decision list to transmit, to the client system, the video clip and the video effect as separate media files, wherein the client system plays the video clip by overlaying the video effect on the video clip in real-time for an entire duration of the video clip according to the parent-child relationship, the overlaying performed without compiling or rendering the video clip and the video effect into a new media file.

6. The method of claim 5, wherein the video effect comprises at least one of a video, a photo, a graphic, a caption, a thought bubble, an illustration, an animation, a transition, audio, or a project.

7. The method of claim 5, further comprising receiving an instruction for customization of the video effect, at the server system, and including the instruction for customization of the video effect in the edit decision list.

8. The method of claim 7, wherein the customization comprises a modification to at least one of a size, a shape, a color, or a duration of the video effect.

9. A system comprising:
a processor; and
a memory communicatively coupled to the processor, wherein the processor is configured to execute instructions included in the memory to perform operations comprising:
receiving an input for applying a video effect to a video clip, wherein the video effect and the video clip are stored in a storage system accessible by a server system remote from the system;
based on the input, creating, at the system, a parent-child relationship between the video clip and the video effect, wherein the parent-child relationship associates the video clip and the video effect so that video customization operations on the video clip by the system are also processed on the video effect by the system and that video customization operations on the video effect by the system are processed on the video effect independent of the video clip;
in response to receiving, at the system, an additional input to play the video clip, receiving, at the system from the server system, the video clip and the video effect as separate media files, wherein the server system does not apply the video effect to the video clip; and
playing, at the system, the video clip by overlaying the video effect on the video clip for an entire duration of the video clip according to the parent-child relationship in real-time without compiling or rendering the video clip and the video effect into a single media file.

10. The system of claim 9, wherein the processor is configured to execute instructions further comprising:
presenting a seamline, the seamline comprising a representation of the video clip;
presenting a plurality of video effects, the plurality of video effects including the video effect, and
receiving a drag of a representation of the video effect to the representation of the video clip to generate the parent-child relationship between the video clip and the video effect.

11. The system of claim 9, wherein the processor is configured to execute instructions further comprising:
receiving a selection of a split point within the video clip;
creating a first split video clip and a second split video clip based on the video clip and the split point;
maintaining the parent-child relationship between the video effect and the first split video clip, and
creating a second parent-child relationship between an instance of the video effect and the second split video clip.

12. The system of claim 9, wherein the processor is configured to execute instructions further comprising:
in response to receiving a command to apply a video customization operation to the video effect, determining from the parent-child relationship that the video customization operation is to be applied to the video effect independent of the video clip; and
receiving a customized video clip from the server system and playing the video clip by overlaying the customized video effect on the video clip in real-time without compiling or rendering the video clip and the customized video effect into a single media file.

13. The system of claim 9, wherein the processor is configured to execute instructions further comprising:
in response to receiving a command to apply a video customization operation to the video clip, determining from the parent-child relationship that the video customization operation is to be applied to the video clip and to the video effect; and
receiving a customized video clip and a customized video effect from the server system and playing the customized video clip by overlaying the customized video effect on the customized video clip in real-time without compiling or rendering the customized video clip and the customized video effect into a single media file.

14. The system of claim 12, wherein the video customization operation comprises a modification to at least one of a size, a shape, a color, or a duration of the video effect.

15. The method of claim 3, wherein the video customization operation comprises a modification to at least one of a size, a shape, a color, or a duration of the video effect.

* * * * *